May 5, 1936.    R. S. TROTT    2,040,035
CLUTCH CONTROL MECHANISM
Original Filed Nov. 10, 1931
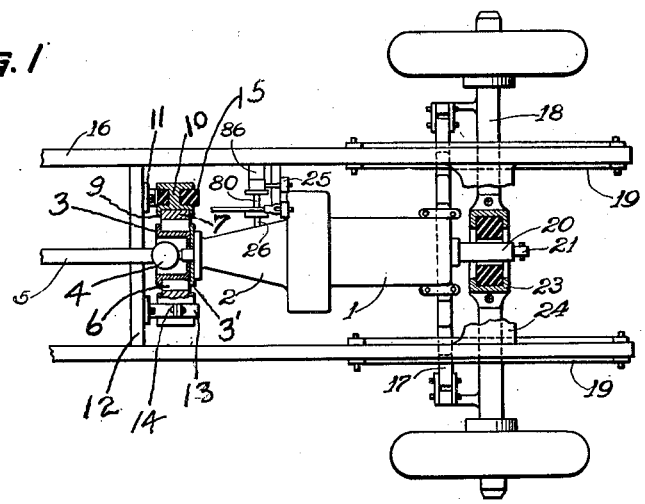
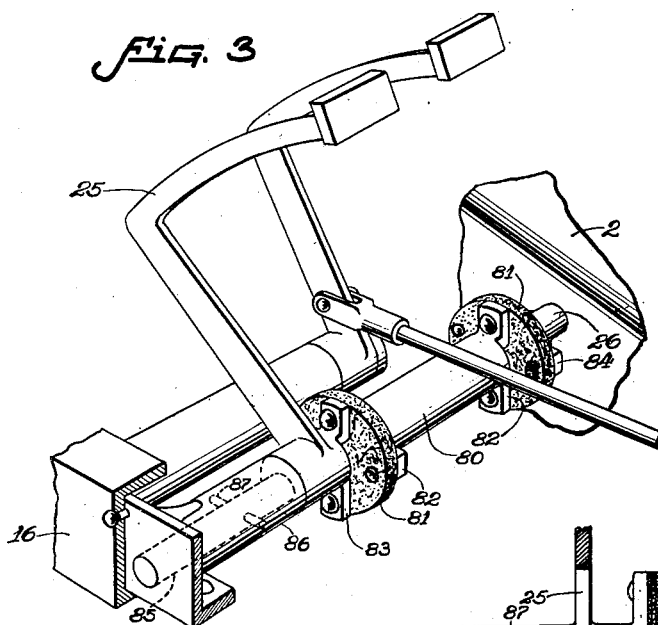
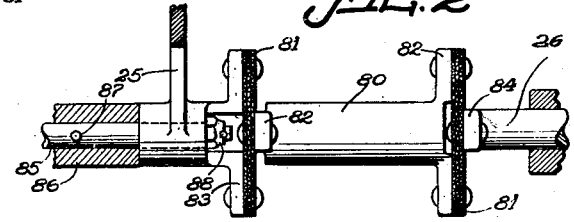
Inventor
Rolland S. Trott
Vernon E. Hodges, Attorney Patented May 5, 1936

2,040,035

UNITED STATES PATENT OFFICE 2,040,035

CLUTCH CONTROL MECHANISM

Rolland S. Trott, Denver, Colo.

Application November 10, 1931, Serial No. 574,173
Renewed August 3, 1935

8 Claims. (Cl. 180—64)

This invention relates to control mountings for engines having torque and force cushioning movements with respect to the support upon which they are mounted and more particularly to clutch control apparatus for such an engine unit; it is a continuation in part of my application for patent on Engine mountings, filed on November 24, 1928, Serial No. 321,634, now Patent No. 1,890,871, granted December 13, 1932.

The object of this invention is to provide clutch control mechanism mounted upon the frame of a vehicle whose power plant has pivotal and orbital movements with respect to the frame.

I accomplish this object by providing a mounting for the clutch pedal upon the frame and by providing a connection between the clutch pedal and the clutch shaft of the power plant, which will accommodate for the movements of the power plant with respect to the frame substantially without effecting any variation in the position of the said clutch shaft relative to the power plant. This construction is fully explained below and is illustrated in the drawing in which:—

Figure 1 is a fragmentary plan view and partial section of a vehicle having a power plant unit with open propeller shaft, semi-elliptic front springs, a roller bearing mounted in rubber for the support of the rear of the power plant upon the frame, and my clutch control construction.

Figure 2 is a fragmentary detail view and partial section of the clutch and pedal shafts and connections.

Figure 3 is a view in perspective of the construction shown in Figure 2.

In Figure 1, the engine 1 has the transmission and clutch housing 2 integral therewith, forming a unit power plant. The rear end of the power plant is mounted upon the frame cross member 12 so arranged as to have cushioned pivotal movement with respect to the frame, whereby the rear of the power plant may not only pivot about a longitudinal axis but may, under the action of engine forces, float in an orbit due to the rubber mounting. The front end of the power plant is mounted upon a cross spring 17 on the front axle 18 of the vehicle as shown, such mounting permitting and resiliently limiting the transverse movements of the front end of the engine as well as the pivotal movements of the engine as a whole with respect to the frame. The engine bracket 20 and the rubber cushion 23, which is mounted on the frame, act to resiliently limit the relative movements of the front of the engine unit and the frame.

To the rear end of the power plant is attached the mounting bracket 3, surrounding and concentric with the universal joint 4, to which is connected the propeller shaft 5. Between the mounting bracket 3 and the transmission and clutch housing 2 is clamped the plate 3'.

The bracket 3 forms the inner track of a roller bearing having rollers 6 and outer track 7. The plate 3' acts to retain the rollers 6.

The flanged support ring 9, provided with the flanged support pins 10, receives the outer track 7, but may be made integral therewith if desired.

The frame brackets 11, properly attached to the frame cross member 12, are each provided with a cap 13, secured thereto by the bolts 14, 15 and thereby forming an apertured end for the bracket.

The flanged support pins 10 are surrounded by the cushion members 15, composed of proper cushioning material such as rubber, and supported in the frame brackets 11.

It will be seen that this method of mounting the rear end of the power plant, permits torsional action of the power plant with respect to the frame, and because of the free movement provided by the roller bearing mounting, the torsional movement of the power plant can impart no vibration to the frame 16 that is due to torque reaction.

The cushion supplied by the members 15 permits slight distortions of the power plant with respect to the frame without strain, noise, or shock, and will tend to absorb any vibration due to lack of perfection in the construction of the power plant.

It will be noted that ny slight endwise movement of the engine unit due to action of the spring 17 will be permitted by the rubber of the rear mounting, or even by slight endwise movement of the rollers in their outer track.

The engine unit mounting described above is more particularly described and claimed in my Patent No. 1,890,871, granted December 13, 1932.

The clutch within the clutch and transmission housing 2 is the usual friction clutch which serves to connect the engine crankshaft with the transmission. The clutch ordinarily employed in automobiles is of the disk type held engaged by spring means but disengaged by a foot pedal.

The clutch pedal 25 is connected to the clutch shaft 26 of the power plant by the shaft 80 and the two flexible discs 81. The shaft 80 has at each end a cross arm 82, the two cross arms being angularly spaced at 90° from each other. The clutch pedal has the cross arm 83 and the clutch shaft has the cross arm 84. The cross arms of the shaft 80 are angularly spaced from the cross arms of the clutch pedal 25 and of the clutch shaft 26 respectively by 90°. The discs 81 are to be made of steel, leather, fabric or any proper natural or synthetic material, which will give the desired degree of flexibility and permit slight variation of the distance between the cross arm 83 of the pedal 25 and the cross arm 84 of the shaft 26.

The shaft 85 is mounted in the bracket 86 and secured therein by the pin 87 or in any other proper manner. The bracket 86 is properly mounted upon the frame 16. The pedal 25 is journaled upon the shaft 85, where it is held in place by the nut 88; or the pedal 25 may be pivotally mounted and secured upon the frame 16 in any other proper manner and by any other proper construction so long as it is free to be operated as a pedal.

Thus, as the pedal 25 is depressed, the clutch shaft 26 will be operated to release the clutch just as certainly as if the pedal 25 were mounted directly upon the shaft 26.

But it will be seen that pivotal, orbital, vertical, horizontal or endwise movements of the power plant 1 with respect to the frame 16 may occur within reasonable limits without undue strain upon the clutch control mechanism and without materially changing the angular position of the clutch shaft 26 relative to the power plant.

The flexible connection between the clutch pedal 25 and clutch shaft 26 provides for disengagement of the clutch without applying endwise pressure on the engine unit. This is important where the engine unit is mounted on resilient supports that are yieldable longitudinally of the engine unit. If endwise pressure is applied to the engine unit in releasing the clutch, it results in a chatter and vibration in the driver's operation of the clutch that is very objectionable. When the engine pulls, it tends to slip the clutch. If the engine can slip the clutch by moving forward, there will be a tendency for forward movement. If the engine moves forward, it is the same relatively as if the clutch pedal were permitted to move backward slightly. If this takes place at each engine explosion, it would be the same in effect as rapid back and forth movement of the clutch pedal, and results in chattering of the clutch. In this invention the clutch releasing pressure is transmitted from the frame to the engine unit by a twisting motion so when the clutch is being engaged and the engine unit is oscillating, there is no endwise thrust or movement of the engine unit and the clutch will engage and disengage without chatter.

Having now described my invention what I claim as new and desire to protect by Letters Patent is as follows:

1. In a motor vehicle having an engine unit and a frame structure, means mounting the engine unit in the frame structure for oscillatory movement relative thereto, a clutch shaft mounted on the engine unit for movement therewith relative to the frame, said shaft having a pair of arms, a clutch pedal member pivotally mounted on the frame structure, and having a pair of arms, and means including non-metallic flexible means connecting the arms of the clutch shaft and clutch pedal together.

2. In a vehicle including a frame and an internal combustion engine unit having a clutch and yieldably mounted on the frame for oscillatory movement relative thereto, control apparatus for said clutch including a shaft rotatably mounted on the engine unit, a lever fixed to the outer end of the shaft and extending on opposite sides of the axis thereof, a clutch pedal pivotally mounted on the frame and having a lever rigid therewith and extending on respectively opposite sides of its axis of rotation, said pedal being held immovable transversely relative to the frame, and flexible means connecting the levers of the clutch-shaft and the pedal together and connected to each lever on opposite sides of the respective axes of the clutch-shaft and pedal whereby oscillatory movement of the engine unit is permitted.

3. In a vehicle including a frame and an internal combustion engine unit having a clutch and yieldably mounted on the frame for oscillatory movement relative thereto, control apparatus for said clutch including a shaft rotatably mounted on the engine unit, a lever fixed to the outer end of the shaft and extending on opposite sides of the axis thereof, a clutch pedal having a lever rigid therewith and extending on respectively opposite sides of its axis of rotation, means pivotally mounting said pedal on the frame and holding said pedal immovable transversely relative to the frame, and flexible means connecting the levers of the clutch shaft and the pedal together and connected to each lever on opposite sides of the respective axes of the clutch-shaft and pedal, whereby oscillatory movement of the engine unit is permitted without transmitting vibration to the clutch pedal.

4. In a motor vehicle having a frame structure, the combination of an engine unit having a turnable clutch operating means movable bodily with the engine unit, means mounting said engine unit on the vehicle for oscillatory movement relative to the frame structure, a clutch disengaging member, means pivotally mounting said member on the frame structure, and means connecting said clutch disengaging member with the clutch operating means comprising a transversely disposed torque transmitting member, the ends of which have universal connections with the clutch disengaging member and clutch operating means respectively, at least one of said connections being flexible in a direction longitudinally of the torque transmitting member, whereby the clutch means is actuated by the clutch disengaging member, and whereby the engine may oscillate relative to the frame structure.

5. In a motor vehicle having a frame structure, the combination of an engine unit having a rotatable clutch operating means movable bodily with the engine unit, means mounting said engine unit on the vehicle for oscillatory movement relative to the frame structure, a clutch disengaging member, means pivotally mounting said member on the frame structure, and means connecting said clutch disengaging member with the clutch operating means comprising a transversely disposed torque transmitting member universally and flexibly connected at its ends to the clutch disengaging member and clutch operating means respectively, said end connections being flexible in a direction longitudinally of the torque transmitting member, whereby the engine unit may oscillate relative to the frame structure and whereby the clutch operating means is actuated by the clutch disengaging member without applying endwise pressure to the engine unit.

6. In a motor vehicle having a frame structure, the combination of an engine unit having a turnable clutch operating means movable bodily with the engine unit, means mounting said engine unit on the vehicle for oscillatory movement relative to the frame structure, a clutch pedal pivotally mounted on the frame structure to move bodily with movements of the frame structure, and a transversely disposed rock-shaft the ends of which are universally connected to the clutch pedal and clutch operating means respectively, and at least one of said end connections being flexible in a direction longitudinally of said rock-shaft permitting oscillatory movement of the engine unit relative to the frame structure, and whereby the clutch operating means is actuated by the clutch pedal without applying endwise pressure to the engine unit.

7. In a motor vehicle having a frame structure, the combination of an engine unit having a turnable clutch operating member movable bodily with the engine unit, means mounting said engine unit on the vehicle for oscillatory movement relative to the frame structure, a clutch disengaging member, means pivotally mounting said clutch disengaging member on the frame structure, and means connecting said clutch disengaging member with the clutch operating member comprising a transversely disposed torque transmitting member the ends of which have universal connections with the clutch disengaging member and clutch operating member respectively, at least one of said universal connections being of such construction that the members connected together thereby may have relative movement in a direction longitudinally of the torque transmitting member, whereby the clutch operating member is actuated by the clutch disengaging member, and whereby the engine unit may oscillate relative to the frame structure.

8. In a motor vehicle having a frame structure, the combination of an engine unit mounted in the vehicle for oscillatory movement relative to the frame structure and having a clutch operating member movable bodily with the engine unit, a clutch disengaging member pivotally mounted on the frame structure, and means connecting said clutch disengaging member with the clutch operating member comprising a transversely disposed torque transmitting member, the ends of which have connections with the clutch disengaging member, and the clutch operating member respectively, said connections permitting universal movement of both ends of said torque transmitting member, at least one of said connections being constructed to permit relative movement between the members connected together thereby in a direction longitudinally of the torque transmitting member, whereby the clutch operating member is actuated by the clutch disengaging member, and whereby the engine unit may oscillate relative to the frame structure.

ROLLAND S. TROTT.